(12) United States Patent
Feller

(10) Patent No.: US 6,725,733 B1
(45) Date of Patent: Apr. 27, 2004

(54) TORQUE BALANCE FLOW METER

(76) Inventor: Murray F. Feller, 21577 NW. 75th Ave. Rd., Micanopy, FL (US) 32667

( * ) Notice: Subject to any disclaimer, the term of this patent is extended or adjusted under 35 U.S.C. 154(b) by 0 days.

(21) Appl. No.: 10/456,602

(22) Filed: Jun. 6, 2003

(51) Int. Cl.$^7$ ................................................ G01F 1/28
(52) U.S. Cl. ...................................................... 73/861.74
(58) Field of Search .................. 73/861.74, 861.71, 73/861.73, 861.78

(56) References Cited

U.S. PATENT DOCUMENTS

| | | | |
|---|---|---|---|
| 4,899,598 A | * 2/1990 | Gumaste et al. | ........ 73/862.335 |
| 4,911,022 A | 3/1990 | Lew | ........................ 73/861.75 |
| 5,948,978 A | 9/1999 | Feller | ....................... 73/204.15 |
| 6,333,626 B1 | 12/2001 | Edwards | ..................... 324/110 |

* cited by examiner

*Primary Examiner*—Harshad Patel
(74) *Attorney, Agent, or Firm*—David Kiewit

(57) ABSTRACT

Fluid flow rate can be measured by determining the torque on a shaft used to oscillate or rotate a vane in the fluid. An intermediate gear, which links a drive gear to a gear on the vane shaft, is mounted in a yoke so that the shaft torque tends to move the intermediate gear out of position. An actuator controlled by a feedback control system is used to maintain the intermediate gear in nominal alignment. The forces required for this null-balancing operation are representative of the torque, and thus of the fluid flow rate.

24 Claims, 4 Drawing Sheets

TORQUE BALANCE FLOW METER

BACKGROUND OF THE INVENTION

1. Field of the Invention

This invention generally relates to null-balancing apparatus for measuring and controlling torque, and more specifically relates to the use of such apparatus for measuring fluid flow rate.

2. Background Information

Torque measurement is generally avoided in commercial products because of the difficulty in isolating the measurement means from the apparatus being measured. These limitations are the primary disadvantages of such means when applied to commercially available target flow sensors, which typically use a static strain gage arrangement to detect the torque produced by fluid impacting on a target.

Improved target meters have been disclosed by the inventor in his two current pending U.S. Patent Applications for moving target flow meters. One of these applications was filed on Apr. 1 2002 and has Ser. No. 10/113,411. The other of these applications was filed on Aug. 2, 2002, and has Ser. No. 10/211,211. Moreover, in his U.S. Pat. No. 5,948,978, entitled Induction Heated Mass Flow Sensor, the inventor has described an electromagnetic actuator (see FIGS. 4 and 4A therein) similar to that used in the present invention. The disclosures of U.S. Pat. No. 5,948,978, 10/113,411 and U.S. Ser. No. 10/211,211 are included herein by reference.

BRIEF SUMMARY OF THE INVENTION

The invention provides null-balancing apparatus for measuring a rate of flow of a fluid impacting a vane fixedly attached to a vane shaft journaled within a housing. This apparatus preferably comprises a torque linking mechanism linking the vane shaft to a drive shaft arranged to be turned by a drive shaft actuator disposed within the housing and journaled within a yoke. The torque linking mechanism is carried by the yoke and arranged so that a first torque applied to either one of the drive the output shafts results in a second torque applied to the other of those two shafts, and so that the applied torque moves the yoke away from its selected normal setting. The apparatus also comprises a feedback control circuit; a position sensor for supplying an imbalance signal to the feedback control circuit responsive to the motion of the yoke away from its normal setting; a yoke actuator for supplying, under control of the feedback control circuit, a restoring force to the yoke to drive the yoke towards the normal setting; and a signal processor for deriving, from an electrical parameter representative of the restoring force, the rate of flow of the fluid impacting the vane.

In a preferred embodiment of the invention, the yoke position is sensed photoelectric displacement detector comprising two photodetectors illuminated with radiant energy from a single photoemitter so that a part of the yoke structure differentially blocks a portion of that energy reaching the photodetectors. The output from the photodetectors vary inversely corresponding to the offset of the yoke position from its initial straight alignment and their signals are used by an amplifier to power an electromagnet producing magnetic flux which acts on a pair of permanent magnets attached to the yoke in a feedback arrangement to restore the initial alignment A preferred embodiment of the invention uses a gear train having three gears connected in series between a motor and its load. Both the motor drive shaft and the output load shaft are journaled for rotation within bearings fixed to a housing or other fixed support The drive shaft is also journaled within a yoke, and the shaft of the intermediate gear is journaled only with the yoke. In this arrangement, if unrestrained, the intermediate gear would tend to orbit around the motor gear. In the null-balancing measurement arrangement of the invention, however, the yoke position is electronically detected by a suitable position sensor and a correcting torque is applied by electromagnetic means to the yoke to maintain the normal meshed alignment of the gears. Electrical signals used to produce the correcting torque are a measure of the torque applied to the load gear.

Other embodiments of the invention provide for turning the output shaft through less than a complete revolution. In some such embodiments the torque linking mechanism comprises a rocker arm carried by a yoke that co-acts with axially oriented eccentric drive pins mounted on rotating elements fixedly attached to the drive and output shafts.

In another embodiment of the invention, a Hall effect magnetic sensor detects the magnetic flux from the two permanent magnets. This sensor signal is also used with an amplifier to power an electromagnet which acts on the two permanent magnets attached to the yoke to restore the initial straight alignment.

In a further embodiment, the output shaft is used to rotate a vane in a fluid stream so that the torque measurement resulting from the effects of the fluid flow on the vane is used to provide a measure of the fluid flow rate. Thus, it is a particular object of this invention to provide an improved means for measuring torque and in particular, to apply that to target flow meters.

In some embodiments the drive shaft actuator is not an ordinary electric motor, but comprises an electromagnet that co-acts with a pair of oppositely poled permanent magnets eccentrically attached to a drive disk that is fixedly attached to the drive shaft.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the features and advantages may be provided by some embodiments.

DETAILED DESCRIPTION OF THE INVENTION

Figure 1A:
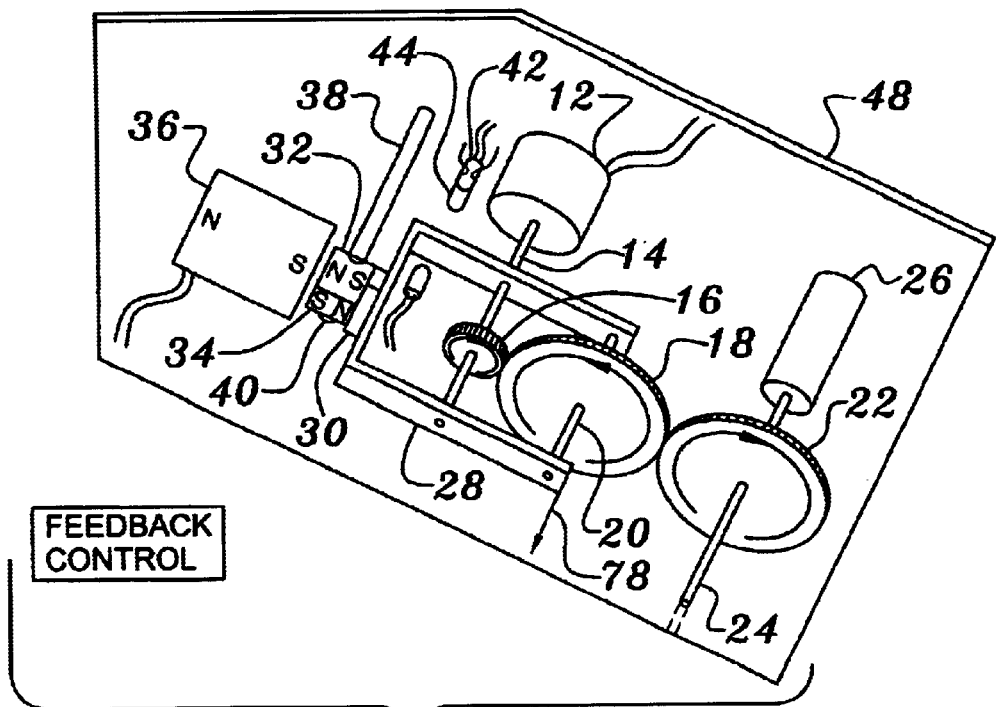
FIG. 1A is a partly schematic perspective view of principle components of a preferred embodiment of the invention.
Figure 1B:
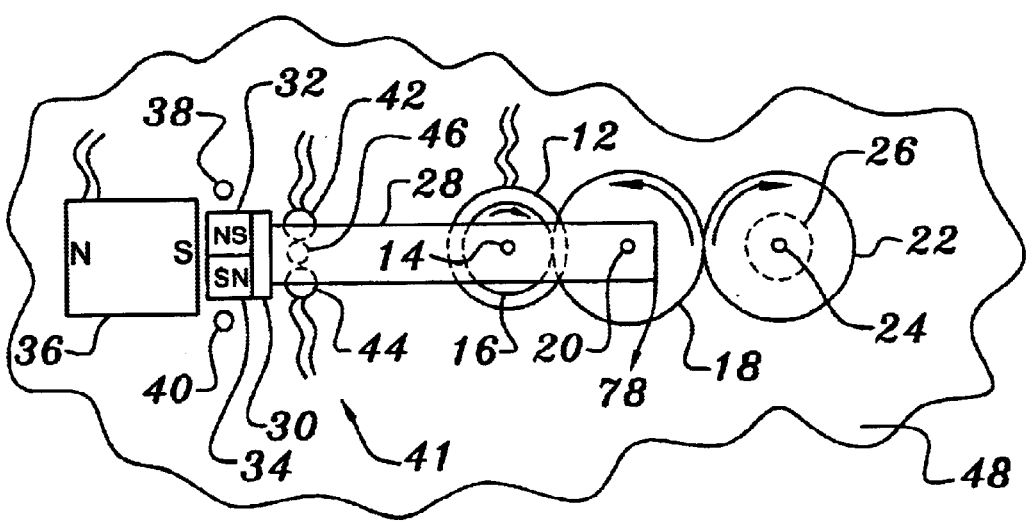
FIG. 1B is a side view of the components of FIG. 1A.

The principle components of a preferred embodiment of a null-balancing torquesnsor of the present invention 10 are illustrated in FIGS. 1A and 1B. A drive shaft actuator, which may be an electric motor 12 powered by an external power source, not shown, is used to rotate a drive shaft 14 upon which is mounted a drive gear 16. The drive gear 16 engages an intermediate gear 18 mounted on a respective intermediate gear shaft 20 which also engages a load gear 22 mounted on an output shaft 24. The output shaft 24 is attached to a shaft mount 26 and is journaled for rotation within a fixed housing 48 that also houses the motor 12, electromagnet 36 and stops 38 and 40. The drive shaft 14 is rotatable within a fixed frame of reference such as the housing and is also journaled within a yoke 28. The yoke 28 also carries an intermediate shaft 20 associated with the intermediate gear 18. Those skilled in the arts of gear drives will recognize that rotation of the intermediate gear 18 may be provided by fixedly connecting it to the shaft 20, which is then journaled within the yoke 28, or by fixedly connecting the shaft 20 to the yoke 28 and journaling the gear 18 about the shaft 20. In an initial normal setting, in which no torque is applied, the three gears 16, 18, 22 are in a straight alignment in which the centers of rotation of all three gears are co-linear.

In one preferred embodiment, a magnetic plate 30 having permanent magnets 32, 34 fixedly attached thereto, is attached to the yoke 28. A position sensing apparatus 41, which preferably comprises a photoemitter 46 directly illuminating portions of a pair of photodetectors 42 and 44, is disposed adjacent the yoke to detect its motion away from a normal meshed setting. Preferably, when the gears 16,18,22 are meshed in a normally aligned setting, the illumination on the two photodetectors is selected to be equal. A feedback control 76 is electrically connected to the photodetectors 42, 44 and the electromagnet 36, and provides the output signal indicative of load torque experienced by load gear 22.

Figure 1C:
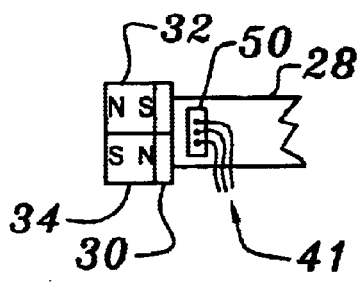
FIG. 1C is a side view of the yoke showing a Hall effect magnetic sensor.

During operation of the embodiment depicted in FIGS. 1A–1C, the drive gear 16 rotates clockwise and rotates the intermediate gear 18 counter clockwise which then drives the output gear 22 clockwise as indicated by the curved arrows on the respective gears. Because the intermediate shaft 20 is connected only to the yoke 28, any loading of the output gear 22 will make the intermediate gear 18 and, correspondingly, its shaft and the right side of the yoke 28 move downwardly as indicated by the arrow 78. Because the yoke 28 rotates about the drive shaft 14, its left side moves upwards so as to further block the illumination that photodetector 42 receives and so as to increase the illumination provided to the other photodetector 44. A feedback controller 76 detects the unbalance in the illumination levels reaching the photo detectors 42 and 44 and provides an electrical output signal to a yoke actuator that supplies a counter-acting restoring torque to the yoke 28 in order to drive it back to the normal setting. In the preferred embodiment, the yoke actuator comprises an electromagnet 36 co-acting with permanent magnets 32, 34 fixedly attached to the yoke. In the situation described above, the initial upward displacement of the yoke leads to the feedback circuit 76 energizing electromagnet 36 to impose a magnetic field having the polarity indicated in FIG. 1B. This field interacts with the magnetic fields of the permanent magnets 32, 34 to attract the one tagnet 32 and repel the other 34 so as to move the assembly downwards and to thereby maintain, within close limits, the alignment of the gears. The magnitude of this null-balancing electrical signal to the electromagnet 36 is hence a measure of the load torque. If the initial displacement had been in the opposite direction the illumination imbalance would have been inverted and the feedback circuit would have energized the electromagnet 36 with the opposite polarity of magnetic flux to reestablish alignment pf the gears. The polarity of the signal to the electromagnet 36 indicates torque direction so that if the load should drive the motor 12, the load torque would still be measured. Thus, operation is possible with motor rotation in either direction, with either constant or varying speed motors 12, and when there is no motor rotation.

Mechanical stops 38 and 40 are preferably provided to mechanically prevent excessive rotation of the yoke, particularly under fault conditions. An undesired rotation of this sort could result in disengagement of the intermediate gear 18 from the load gear 22. Because the photodetectors 42, 44 and the feedback control 76 can respond to very small offsets from perfect gear alignment, the movement at the position indicated by the arrow 78 is typically only a few thousandths of an inch over a wide range of load conditions Thus, the mechanical assembly is very stable and contributes only minimally to the torque measurement error. Hence, torque can be measured with high precision over a wide range. Furthermore, the distance between the permanent magnets 32 and 34 and the center of the drive shaft 14, relative to the distance between the center of the shaft 14 and the pitch radius of the intermediate gear 18, may be made large in order to increase the photoelectric detection sensitivity of the yoke 28 position and to thereby provide a mechanical advantage to the co-acting arrangement of the electromagnet 36 and the two permanent magnets 32, 34 for maintaining alignment.

Those skilled in the torque transmission arts will appreciate that any of the depicted single gears can be replaced with more complex gearing arrangements, such as a multi-gear transmission. This is particularly true for the intermediate gear 18, and may be an approach selected to control the torque-speed relationship between the motor and load. The yoke 28 and all of the components it supports, such as the magnets 32, 34, the plate 30, the gears 16, 18 and the shaft 20, is preferably balanced with respect to the shaft 14 in order to cancel the effects of gravity. This allows torque measurements that are largely immune from orientation effects.

Those skilled in the art will recognize that many other sorts of position sensing apparatus 41 can be used with the measurement apparatus of the invention. For example, FIG. 1C illustrates a Hall effect magnetic flux sensor 50 used in place of the photoelectric displacement detector comprising the photoemitter 46 and photodetectors 42, 44 of FIGS. 1A and 1B. Plate 30 is made from a magnetic material and is thin enough to allow some of the flux to pass through it for detection by sensor the 50. As in the previously described embodiment, the feedback control 76 uses the signal from the sensor 50 to power the electromagnet 36 and, as in FIGS. 1A and 1B, to provide null-balance feedback control for maintaining gear alignment Although the photodetector and Hall sensing approaches herein described are believed to be the best alternatives, one could also consider other optical measurement approaches as well as the use of any of a variety of capacitive, inductive, or other position sensors as the yoke position sensing apparatus 41.

Figure 1D:
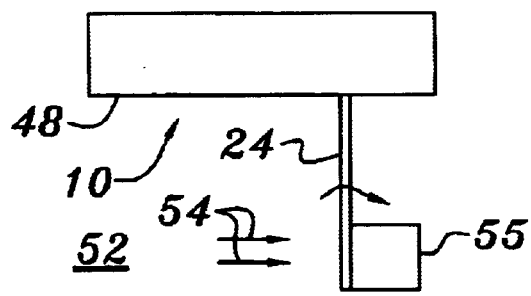
FIG. 1D is a schematic depiction of a preferred embodiment of the invention used in a flow sensor application.

FIG. 1D illustrates an application of the null-balancing torque sensing apparatus of the invention to a flow sensor in which fluid 52 flows in a direction indicated with the arrows 54 and engages a vane 55 which is attached to a rotatable or oscillatable shaft 24 that is the output shaft depicted in FIGS 1A, 1B and 1C. As is known in-the art, the shaft 24 may be the simple continuous shaft that is shown, or may be a more complex structure having the same function of coupling the vane to the measurement and control equipment. In particular, the output shaft 24 may comprise a magnetic, or other, coupling used to transmit the shaft forces and torques from inside a pipe or other flow region to outside the flow region without having fluid leak out through the coupling.

Figure 3:
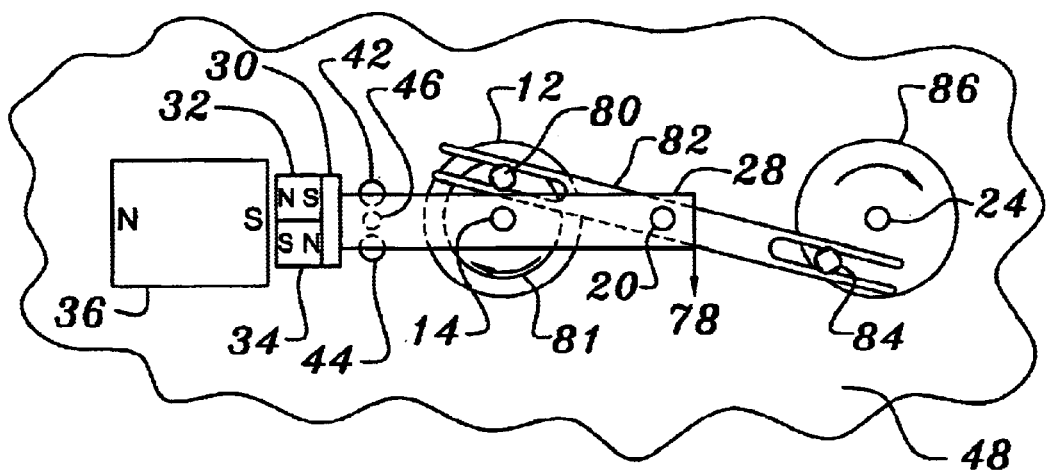
FIG. 3 is a partly schematic elevational view of principle components of a second embodiment of the invention.

Turning now to FIG. 3, one finds an alternate embodiment in which the torque linking mechanism comprises a rocker arm 82 attached to an intermediate shaft 20 carried by the yoke 28. Bifurcating slots at both ends of the arm 82 couple it to axially oriented eccentric pins 80,84 that protrude, respectively, from a drive wheel 81 and an output shaft wheel 86. As depicted, the eccentric pins 80, 84, are parallel to the respective shafts 14,24. In this arrangement, when the motor 12 rotates the drive wheel, which is fixedly attached to the drive shaft 14, the torque linking mechanism causes the output shaft 24, which is fixedly attached to the output wheel to oscillate. The detection and balancing of the motion of the yoke 28 may, of course, be done in any of a variety of methods, as has been previously discussed herein.

Figure 4:
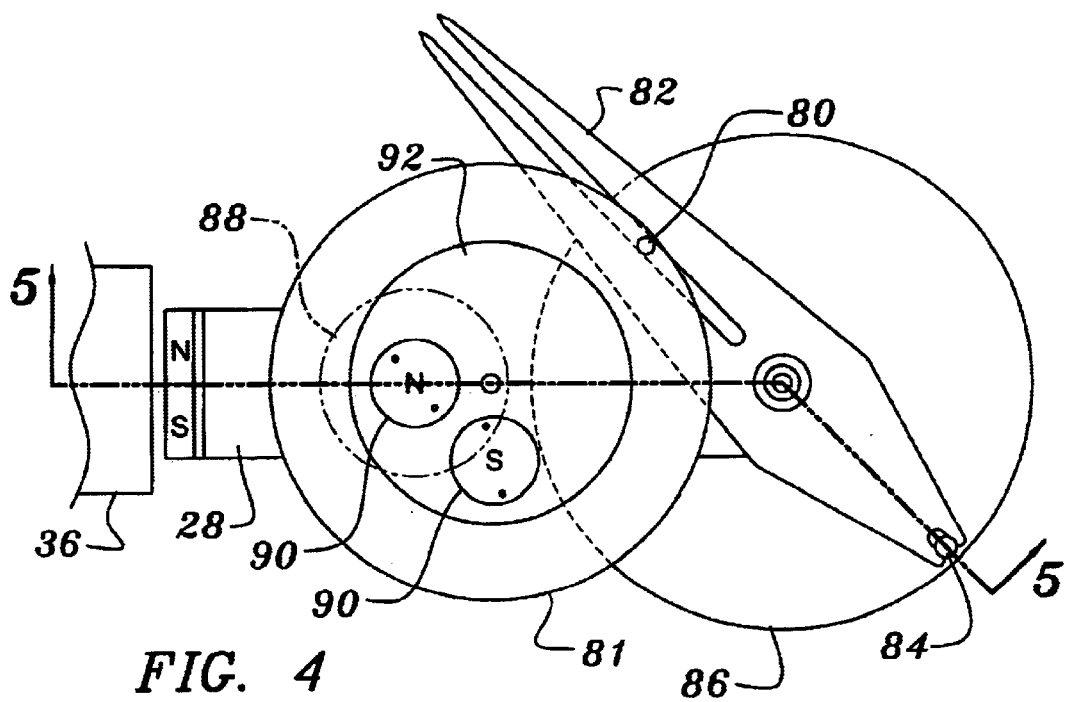
FIG. 4 is a plan view, from which supporting surfaces have been cut away in the interest of clarity of presentation, of a third embodiment of the invention.
Figure 5:
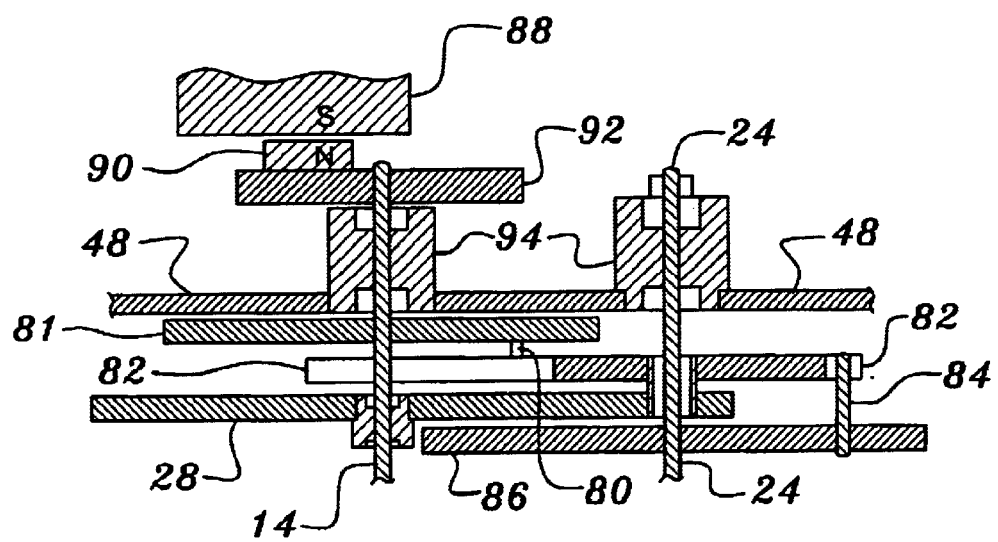
FIG. 5 is a cross sectional view in which the surface of section comprises two planes extending, respectively, along an axis of a yoke and along an axis of a rocker arm, as indicated by the double-headed arrow 5—5 in FIG. 4.

Turning now to FIGS. 4 and 5, one finds another alternate embodiment of the invention in which the drive actuator comprises an electromagnet 88 co-acting with a pair of oppositely poled permanent magnets 90 eccentrically attached to a wheel 92 that will hereinafter be referred to as a "drive disk" to distinguish it from various other drive elements, gears, and wheels used in various embodiments of the invention. This drive disk 92 is fixedly attached to a drive shaft 14 supported in a suitable bearing 94 attached to a housing 48 or other suitable fixed support In this embodiment a drive wheel 81 is fixedly attached to the drive shaft 14 on the other side of the support 48 and is coupled, by means of an eccentric drive pin 80 to a rocker arm 82 that is coupled to a driven wheel by means of a second pin 84. As in other configurations, the driven wheel 86 is fixedly attached to an output shaft 24 that can carry a vane. Those skilled in the electromechanical arts will recognize that the drive disk 92 need not be a complete disk and that this element could be replaced by any of a number of other elements, such as a disk sector or a pair of crank arms arranged so that a different one of the two oppositely poled permanent magnets was attached to the end of each crank arm.

As illustrated by the various depicted configurations, the output shaft 24 does not have to rotate continuously or turn in a single direction. In some cases one may choose to have it oscillate so that, for example, the vane 55 can be displaced from an in-line orientation in the fluid flow by a fixed angular amount about a zero setting, such as providing a forty-five degree excursion on either side of the flow direction or displaced by ninety degrees in a single, direction.

Regardless of the particular mechanical embodiment of the invention that is selected, the alternating component of the measured torque signal is preferably the only component used by the signal processor 74 to determine a flow rate. The torque signal corresponding to the steady state frictional losses in the mechanical portions of the sensor 10 are preferably eliminated, e.g., with a high pass filter, so that the resultant torque signal input to the processor 74 varies from zero to a maximum as the vane 55 angle changes with respect to the fluid flow direction 54. This practice enables a very stable zero flow rate calibration reference to be established, thereby increasing the operating range and calibration stability of flow sensor.

When the vane 55 is rotated or oscillated, its angular position with respect to the fluid flow direction 54 changes. In some such positions the flow will aid vane rotation; in other positions it will oppose vane rotation. Opposite polarity signals will be produced with respect to the fluid 52 flow aiding or opposing the vane 55 rotation. The signal processor 74 preferably uses only the difference between those signals to derive the fluid 52 flow rate signals.

One should also recognize that there are a large number of ways in which a sensor of the invention can be operated in addition to the previously described arrangement of measuring a magnitude of a drive current to the yoke actuator. In the embodiment depicted in FIGS. 4 and 5, for example, one could choose to ramp up voltage on tie drive actuator electromagnet 88 relatively slowly and then detect the angular setting at which the measured torque passed through zero. The level of the torque related signal may also be used to trigger the reversal of the direction of the vane 55 so that its angular displacement diminishes with increasing fluid flow rate. If one uses a constant speed drive from the motor 12, the time between those trigger signals is then a measure of the fluid flow rate.

More than one type of operation may be combined in a flow sensor. For example, the vane, 55 may be rotated continuously in one direction for low fluid flow rates so that the measured torque is directly used to establish the flow rate measurement When the magnitude of the torque related signals exceeds a preset threshold, the direction of the vane rotation is reversed so that the flow rate measurement is then based upon the alternation frequency.

Although the preferred embodiments illustrated in FIGS. 1A, 1B and 1C are relatively simple and cost effective configurations well suited to instrumentation applications, various adaptations, such as those illustrated in FIG. 1D, can be made to suit a wide variety of applications. For example, the plate 30, which provides a low reluctance path between the magnets 32, 34 to improve the magnetic circuit efficiency, can be omitted in order to reduce the mass and the mechanical time constant of the yoke and the parts: attached to it. In addition, the electromagnet 36 may incorporate a magnetic core to increase its magnetic efficiency. Moreover, the magnets 32 and 34, the electromagnet 36 and the plate 30 may be replaced by a torque motor anchored to the back plate 48 and concentric with the drive motor 12 in order to accommodate high torque loads.

Figure 2A:
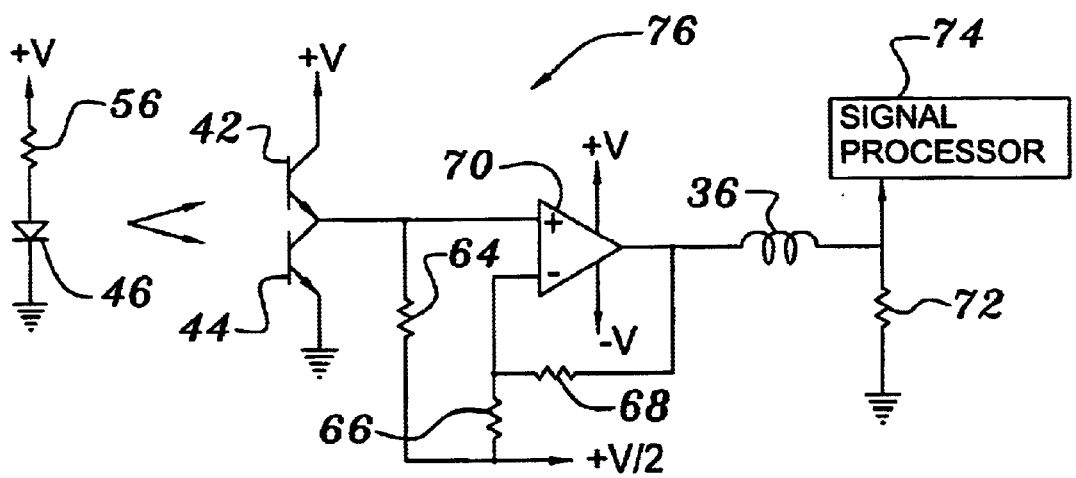
FIG. 2A is a simplified schematic diagram of photoelectric detection means used in a preferred embodiment of the invention.

FIG. 2A illustrates a simplified electrical schematic diagram for sensing and controlling the position of the yoke 28. A photoemitter 46 is connected to a voltage supply through a current limiting resistor 56 to adjust the photoemitter current to the value needed for it to emit the desired illumination intensity to the photodetectors 42 and 44. The photodetectors 42, 44 are series connected to a voltage source with their common connection going to a load resistor 64.

When the photodetectors 42 and 44 receive equal illumination, which is indicative of the yoke 28 being in its aligned position, the output voltage at their common electrode, which is applied to the positive input of a differential amplifier 70, is one half of the supply voltage and is the same as the reference voltage applied to the negative input of the amplifier 70 through a first gain-adjusting resistor 66. In this condition the amplifier 70 output is zero and no current flows through the electromagnet 36 and the output resistor 72. When the yoke 28 is not in its aligned position the photodetectors 42 and 44 receive unequal illumination, thus producing a voltage difference at the inputs of the amplifier 70. This provides a corresponding current through the electromagnet 36 and the output resistor 72 to produce the magnetic field which interacts with the magnets 32, 34, so as to return the yoke 28 to its aligned position. In the circuit depicted in FIG. 2A, the gain-adjusting resistors 66, 68 are used to adjust the gain of the amplifier 70. A signal processor 74 uses the voltage across the output resistor 72 to provide finished output signals appropriate to the application. For example, the peak torque experienced by the rotating vane 55 in FIG. 1D may be detected to provide a measurement of fluid flow rate.

Figure 2B:
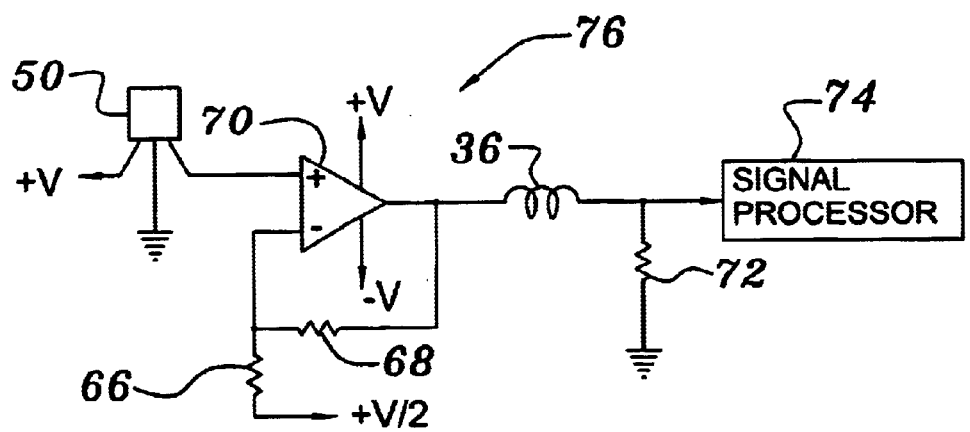
FIG. 2B is a simplified schematic diagram of magnetic detection means used in a preferred embodiment of the invention.

FIG. 2B illustrates a simplified electrical schematic diagram for sensing and controlling the position of the yoke 28 by using a Hall effect magnetic sensor. A Hall effect sensor 50, such as the commercially available Allegro Model 3515 device, provides an output voltage of one half the supply voltage when it is sensing zero magnetic flux and changes from that value corresponding to the polarity and intensity of the applied flux. In FIG. 1c the Hall sensor is arranged to sense flux only in a horizontal direction in an ideal balanced condition, this sensor will not respond to the flux of the two identical permanent magnets 32,34 because when the Hall sensor is midway between them, their fluxes cancel. The Hall effect sensor will therefore provide a voltage output at one half the supply voltage when the yoke 28 is in its aligned position and will vary this voltage as in FIG. 2A to ultimately control the position of the yoke 28 for maintaining it in alignment and to thereby provide the desired output signals.

Although the present invention has been described with respect to several preferred embodiments, many modifications and alterations can be made without departing from the invention. For example, the embodiments incorporating the specific photoelectric and magnetic means for detecting yoke 28 position illustrated herein do not exclude the use of otherwise configured photoelectric or magnetic means or entirely different means as may be based upon potentiometric, acoustic, capacitive or ultrasonic detection principles from being employed. Accordingly, it is intended that all such modifications and alterations be considered as within the spirit and scope of the invention as defined in the attached claims.

What is claimed is:

1. Apparatus for measuring a rate of flow of a fluid impacting a vane fixedly attached to a vane shaft journaled within a housing, the apparatus comprising:
    a drive shaft actuator for turning a drive shaft within the housing, the drive shaft journaled within a yoke;
    a torque linking mechanism journaled within the yoke and linking the drive shaft to the vane shaft so that a torque applied to either of those two shafts moves the yoke away from a normal setting thereof;
    a feedback control circuit;
    a position sensor for supplying an imbalance signal to the feedback control circuit responsive to the motion of the yoke away from the normal setting thereof;
    a yoke actuator for supplying, under control of the feedback control circuit, a restoring force to the yoke to drive the yoke towards the normal setting; and
    a signal processor for deriving, from the restoring force, the rate of flow of the fluid impacting the vane.

2. The apparatus of claim 1 wherein the torque linking mechanism comprises an intermediate gear apparatus interposed between a drive gear fixedly connected to the drive shaft and a load gear fixedly attached to the vane shaft.

3. The apparatus of claim 1 wherein the torque linking mechanism comprises a single intermediate gear interposed between a drive gear fixedly connected to the drive shaft and a load gear fixedly attached to the vane shaft.

4. The apparatus of claim 3 wherein the single intermediate gear is fixedly attached to an intermediate shaft journaled within the yoke.

5. The apparatus of claim 1 wherein the torque linking mechanism comprises a rocker arm connecting a first eccentric pin protruding from a drive wheel fixedly attached to the drive shaft to a second eccentric pin protruding from an output shaft wheel fixedly attached to the vane shaft.

6. The apparatus of claim 1 wherein the position sensor comprises one of a photoelectric displacement detector and a Hall effect sensor.

7. The apparatus of claim 1 wherein the yoke actuator comprises an electromagnet for co-acting with a pair of permanent magnets fixedly attached to the yoke.

8. The apparatus of claim 1 wherein the drive shaft actuator comprises an electric motor for rotating the drive shaft.

9. The apparatus of claim 1 wherein the drive shaft actuator comprises an electromagnet for co-acting with a pair of oppositely poled permanent magnets eccentrically attached to a drive disk fixedly attached to the drive shaft.

10. A method of measuring a torque applied between a drive shaft and an output shaft, the method comprising the steps of:
    supplying a torque linking mechanism journaled into a yoke into which the drive shaft is also journaled, the torque linking mechanism disposed in a selected normal setting when the torque is not applied;
    using a drive shaft actuator to apply the torque, the torque acting to turn the yoke about the drive shaft and away from the normal setting thereof;
    measuring, by means of a position sensor, the motion of the yoke about the drive shaft and supplying an output representative of the motion from the position sensor to a feedback circuit;
    generating, by means of a yoke actuator acting responsive to the feedback circuit, a counter-acting torque moving the yoke back into the normal setting;
    measuring an electrical parameter representative of the counter-acting torque; and
    deriving therefrom the applied torque.

11. The method of claim 10 wherein the yoke actuator comprises an electromagnet co-acting with a pair of permanent magnets fixedly attached to the yoke to generate the counter-acting torque, and wherein the parameter representative of the counter-rotational torque comprises an electric current supplied to the electromagnet.

12. The method of claim 10 wherein the applied torque is supplied by a motor rotating the drive shaft.

13. The method of claim 10 wherein a vane fixedly connected to the output shaft is immersed in a flowing fluid, and wherein the applied torque is representative of the flow rate of the fluid.

14. The method of claim 10 wherein the drive shaft actuator comprises an electric motor and the torque linking mechanism comprises an intermediate gear apparatus.

15. The method of claim 10 wherein the drive shaft actuator comprises an electromagnet co-acting with a pair of oppositely poled permanent magnets eccentrically disposed with respect to the drive shaft.

16. Apparatus for measuring a rate of flow of a fluid impacting a vane and exerting a torque representative of the rate of flow on a vane shaft fixedly attached to the vane, the vane shaft journaled for rotation within a housing, the apparatus comprising;
- an output gear fixedly attached to the vane shaft;
- a motor for rotating a drive shaft rotatable within the housing and journaled for rotation within a yoke;
- a drive gear fixedly attached to the drive shaft;
- an intermediate gear apparatus comprising at least one intermediate gear, the intermediate gear apparatus meshed with both the output gear and the drive gear when the yoke is in a normal setting;
- the intermediate gear apparatus carried by the yoke;
- a feedback control circuit;
- a position sensor for supplying an imbalance signal to the feedback control circuit responsive to motion of the yoke away from the normal setting thereof;
- a yoke actuator for supplying, under control of the feedback control circuit, a restoring torque to the yoke to drive the yoke towards the normal setting; and
- a signal processor for deriving, from the restoring torque, the rate of flow of the fluid impacting the vane.

17. The apparatus of claim 16 wherein the intermediate gear apparatus comprises a single gear.

18. The apparatus of claim 16 wherein the position sensor comprises one of a photoelectric displacement detector and a Hall effect sensor.

19. The apparatus of claim 16 wherein the yoke actuator comprises an electromagnet for co-acting with a pair of permanent magnets fixedly attached to the yoke.

20. Apparatus for measuring a rate of flow of a fluid impacting a vane and exerting a torque representative of the rate of flow on a vane shaft fixedly attached to the vane, the vane shaft journaled for rotation within a housing, the apparatus comprising:
- an output shaft wheel fixedly attached to the vane shaft and having a first axially oriented eccentric drive pin protruding therefrom;
- a drive shaft actuator for turning a drive shaft within the housing, the drive shaft journaled within a yoke;
- a drive wheel fixedly attached to the drive shaft and having a second axially oriented eccentric drive pin protruding therefrom;
- a rocker arm linking the first and second eccentric pins, the rocker arm journaled within the yoke;
- a feedback control circuit;
- a position sensor for supplying an imbalance signal to the feedback control circuit responsive to motion of the yoke away from the normal setting thereof;
- a yoke actuator for supplying, under control of the feedback control circuit, a restoring torque to the yoke to drive the yoke towards the normal setting; and
- a signal processor for deriving, from the restoring torque, the rate of flow of the fluid impacting the vane.

21. The apparatus of claim 20 wherein the drive shaft actuator comprises an electric motor for rotating the drive shaft.

22. The apparatus of claim 20 wherein the drive shaft actuator comprises an electromagnet for co-acting with a pair of oppositely poled permanent magnets eccentrically attached to a drive disk fixedly attached to the drive shaft.

23. The apparatus of claim 20 wherein the position sensor comprises one of a photoelectric displacement detector and a Hall effect sensor.

24. The apparatus of claim 20 wherein the yoke actuator comprises an electromagnet for co-acting with a pair of permanent magnets fixedly attached to the yoke.

* * * * *